(12) United States Patent
Nakagome

(10) Patent No.: US 11,111,171 B2
(45) Date of Patent: Sep. 7, 2021

(54) OPTICAL FIBER, METHOD FOR MANUFACTURING OPTICAL FIBER, AND OPTICAL FIBER PREFORM

(71) Applicant: Fujikura Ltd., Tokyo (JP)

(72) Inventor: Hisayuki Nakagome, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/498,585

(22) PCT Filed: Apr. 3, 2018

(86) PCT No.: PCT/JP2018/014233
§ 371 (c)(1),
(2) Date: Sep. 27, 2019

(87) PCT Pub. No.: WO2018/220995
PCT Pub. Date: Dec. 6, 2018

(65) Prior Publication Data
US 2020/0048137 A1 Feb. 13, 2020

(30) Foreign Application Priority Data
May 30, 2017 (JP) .............................. JP2017-106992

(51) Int. Cl.
*C03B 37/018* (2006.01)
*G02B 6/036* (2006.01)

(52) U.S. Cl.
CPC .... *C03B 37/01853* (2013.01); *G02B 6/03622* (2013.01); *G02B 6/03694* (2013.01)

(58) Field of Classification Search
CPC ............ G02B 6/02395; G02B 6/03694; G02B 6/03622; C03B 37/01853

USPC .......... 385/123, 126, 127; 65/385, 389, 397, 65/426
See application file for complete search history.

(56) References Cited

U.S. PATENT DOCUMENTS 4,111,525 A * 9/1978 Kaminow ............. C03C 13/045
385/124
4,586,943 A    5/1986 Kyoto et al.
(Continued)

FOREIGN PATENT DOCUMENTS

| CN | 1389746 A | 1/2003 |
|---|---|---|
| JP | S58013503 B2 | 3/1983 |

(Continued)

OTHER PUBLICATIONS

"Interactions of hydrogen and deuterium with silica optical fibers: a review" by Stone, Journal of Lightwave Technology, vol. 5, No. 5, pp. 712-733, 1987.*

(Continued)

*Primary Examiner* — Robert Tavlykaev
(74) *Attorney, Agent, or Firm* — Osha Bergman Watanabe & Burton LLP

(57) ABSTRACT

An optical fiber includes: a core; and a cladding layer disposed on an outer circumference of the core. A Cl concentration in the cladding layer is 0.029 wt % to 0.098 wt %. In the optical fiber, $\Delta 2 - \Delta 1 \leq 0$ dB/km is satisfied at a wavelength of 430 nm where $\Delta 1$ is a value of transmission loss before exposure of the optical fiber to hydrogen and $\Delta 2$ is a value of transmission loss after the exposure.

6 Claims, 2 Drawing Sheets

(56) References Cited

U.S. PATENT DOCUMENTS

| | | | | |
|---|---|---|---|---|
| 4,735,475 | A * | 4/1988 | Watanabe | C03B 37/01446 385/123 |
| 6,823,125 | B2 * | 11/2004 | Koumura | C03B 37/01446 385/123 |
| 6,954,572 | B2 * | 10/2005 | Moridaira | C03B 37/01446 385/123 |
| 7,805,039 | B2 * | 9/2010 | Sanders | G02B 6/03605 385/123 |
| 8,891,925 | B2 * | 11/2014 | Bickham | G02B 6/03627 385/127 |
| 8,977,094 | B2 * | 3/2015 | Oyamada | G02B 6/03644 385/126 |
| 2002/0197005 | A1 * | 12/2002 | Chang | C03C 25/00 385/24 |
| 2003/0221459 | A1 | 12/2003 | Walczak | |
| 2006/0115913 | A1 * | 6/2006 | Orita | C03B 37/02754 438/22 |
| 2009/0208760 | A1 * | 8/2009 | Kuwahara | C03B 37/01453 428/428 |
| 2013/0064513 | A1 * | 3/2013 | Nagashima | G02B 6/02366 385/123 |
| 2013/0129291 | A1 * | 5/2013 | Hoshino | G02B 6/0281 385/123 |
| 2015/0329405 | A1 * | 11/2015 | Haruna | G02B 6/02395 385/123 |
| 2016/0009588 | A1 * | 1/2016 | Bookbinder | C03C 13/045 385/123 |
| 2016/0009589 | A1 * | 1/2016 | Billings | C03B 37/01211 385/123 |
| 2016/0124143 | A1 * | 5/2016 | Jacobsen | C03C 25/104 385/124 |
| 2017/0285259 | A1 * | 10/2017 | Nagasu | C03C 13/04 |

FOREIGN PATENT DOCUMENTS

| | | |
|---|---|---|
| JP | S61122137 A | 6/1986 |
| JP | S62038292 B2 | 8/1987 |
| JP | 2000026125 A | 1/2000 |
| JP | 2005206452 A | 8/2005 |
| JP | 2006335638 A | 12/2006 |
| JP | 2012086999 A | 5/2012 |
| WO | 2015181528 A1 | 12/2015 |

OTHER PUBLICATIONS

International Search Report issued in corresponding International Application No. PCT/JP2018/014233, dated Jun. 26, 2018 (2 pages).

* cited by examiner

OPTICAL FIBER, METHOD FOR MANUFACTURING OPTICAL FIBER, AND OPTICAL FIBER PREFORM

CROSS-REFERENCE TO RELATED APPLICATIONS

This is a U.S. national stage application of International Application No. PCT/JP2018/014233, filed on Apr. 3, 2018, which claims priority from Japanese Patent Application No. 2017-106992, filed on May 30, 2017. The contents of these applications are incorporated herein in their entirety.

TECHNICAL FIELD

The present invention relates to an optical fiber, a method for manufacturing an optical fiber, and an optical fiber preform.

BACKGROUND

In an optical fiber used in an optical communication system, in order to increase the possible transmission distance of an optical signal, it is required to improve an optical signal to noise ratio (OSNR). In order to improve the OSNR, it is important to reduce the transmission loss of an optical fiber.

As the optical fiber, a Ge-doped core fiber in which a core is doped with germanium dioxide is generally widely used. However, in a silica core fiber not including the additives, Rayleigh scattering can be further limited as compared to the Ge-doped core fiber, and thus a further reduction in transmission loss is expected. In the silica core fiber, it is important to reduce transmission loss caused by light absorption derived from binding defects of silicon dioxide ($SiO_2$).

In general, in an optical fiber, transmission loss in an optical communication wavelength band increases due to light absorption of an OH group (hydroxy group) caused by binding defects of $SiO_2$. In addition, in an optical fiber, light propagates mainly in a core. Therefore, in order to reduce transmission loss, it is necessary that the core is sufficiently dehydrated to remove an OH group. Therefore, Patent Document 1 discloses a method of dehydrating a core by causing halogen gas such as chlorine gas ($Cl_2$) to flow and to react with hydrogen gas ($H_2$) when a soot deposited using a vapor-phase axial deposition method (VAD method) is sintered. In this method, the dehydration is performed during the formation of a glass preform. Therefore, initial transmission loss of an optical fiber can be reduced.

[Patent Document 1] Japanese Unexamined Patent Application, First Publication No. S58-13503

[Patent Document 2] Japanese Unexamined Patent Application, First Publication No. 2005-206452

As a result of a thorough investigation, the present inventors clarified that, even in an optical fiber in which a core is sufficiently dehydrated and initial transmission loss is low, when dehydration of a cladding layer is insufficient, optical transmission loss increases by being exposed to $H_2$ for a long period of time.

On the other hand, Patent Document 2 discloses a method of dehydrating a cladding layer using $SiCl_4$ after adding fluorine (F) to the cladding layer. However, in this method, a large amount of chlorine (Cl) is added to a cladding layer such that the refractive index of the cladding layer increases due to Cl. Therefore, in order to adjust a difference in refractive index between the core and the cladding, it is necessary to add an excess amount of F to the cladding layer to reduce the refractive index of the cladding layer. As compared to Cl, F tends to further increase Rayleigh scattering due to concentration fluctuation thereof, and the presence of an excess amount of F in the cladding layer in the vicinity of the core leads to an increase in the transmission loss of the optical fiber. In addition, for example, when an increase in raw material costs for adding an excess amount of F is taken into consideration, the method disclosed in Patent Document 2 also has room for improvement.

SUMMARY

One or more embodiments of the present invention provide an optical fiber in which a phenomenon of increasing transmission loss during exposure to hydrogen is limited.

In one or more embodiments, there is provided an optical fiber including: a core; and a cladding layer that is provided on an outer circumference of the core, in which a Cl concentration in the cladding layer is 0.029 wt % to 0.098 wt %.

In one or more embodiments, there is provided a method for manufacturing an optical fiber including a core and a cladding layer that is provided on an outer circumference of the core, the method including dehydrating the cladding layer with Cl-containing gas such that a Cl concentration in the cladding layer is 0.029 wt % to 0.098 wt %.

In one or more embodiments, there is provided an optical fiber preform for manufacturing an optical fiber including a core and a cladding layer that is provided on an outer circumference of the core, in which a Cl concentration in a soot that forms the cladding layer is 0.029 wt % to 0.098 wt %.

According to one or more embodiments of the present invention, an optical fiber in which a phenomenon of increasing transmission loss during exposure to hydrogen is limited can be provided.

DETAILED DESCRIPTION

Hereinafter, an optical fiber, a method for manufacturing an optical fiber, and an optical fiber preform according to one or more embodiments of the present invention will be described.

Figure 1:
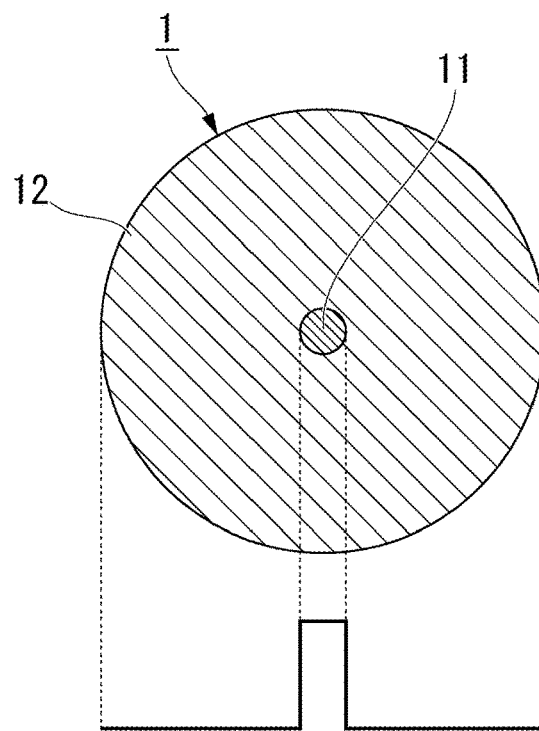
FIG. 1 is a schematic diagram showing a cross-section of an optical fiber according to one or more embodiments of the present invention and a refractive index profile of each of layers.
Figure 2:
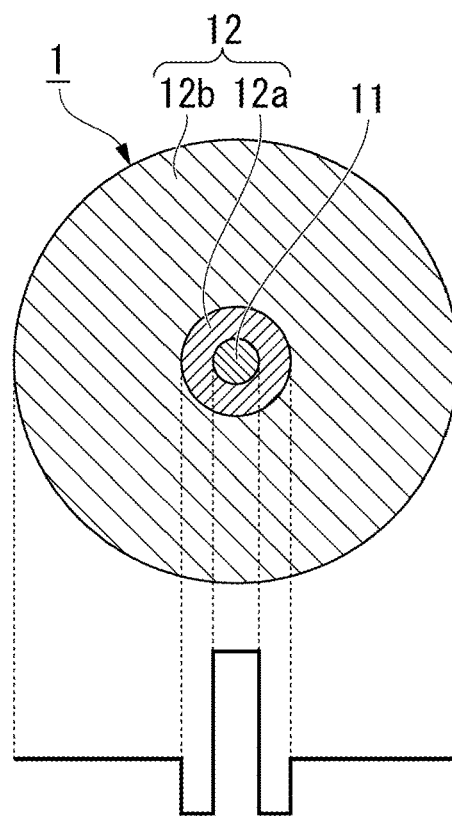
FIG. 2 is a schematic diagram showing a cross-section of an optical fiber according to one or more embodiments and a refractive index profile of each of layers.

The optical fiber according to one or more embodiments is an optical fiber 1 having, for example, a stepwise refractive index profile shown in FIG. 1 or a W-shaped refractive index profile shown in FIG. 2. The refractive index profile of the optical fiber 1 is not limited to the example shown in FIG. 1 or 2.

The optical fiber 1 includes a core 11 and a cladding layer 12 that is formed on an outer circumference of the core 11.

The optical fiber 1 is a silica core fiber in which the core 11 is formed of silicon dioxide ($SiO_2$) and additives such as germanium are not added. The optical fiber 1 shown in FIG. 1 includes the cladding layer 12 having a single-layer structure, and the optical fiber 1 shown in FIG. 2 includes the cladding layer 12 having a multiple-layer structure including an inner cladding layer 12a and an outer cladding layer 12b.

(Method for Manufacturing Optical Fiber Preform)

An optical fiber preform for manufacturing the optical fiber 1 according to one or more embodiments can be manufactured as follows.

First, a soot (hereinafter, referred to as "core soot") that forms the core 11 of $SiO_2$ is formed using a VAD method. At this time, in order to adjust the viscosity of a material that forms the core 11, F may be added to the material using fluorine (F)-containing gas which includes fluorine, the F-containing gas such as $SiF_4$, $C_2F_6$, $SF_6$, or $CF_4$. Alternatively, the material that forms the core 11 may include alkali metal such as sodium (Na) or potassium (K).

Next, Cl-containing gas which includes chlorine, the Cl-containing gas such as $SOCl_2$ or $Cl_2$ is diffused and is caused to react in the core soot such that the core soot is dehydrated. Here, F or the alkali metal for adjusting the viscosity may be added to the core soot.

Next, the dehydrated core soot is heated in a helium (He) atmosphere to be vitrified such that core glass is obtained. In one or more embodiments, the dehydration may be performed such that the core glass includes about 0.2 to 2.0 wt % of Cl. The shape of the refractive index profile of the core may become higher or lower from the outer circumference toward the inside, may be stepwise, or may be flat (uniform).

Next, a soot (hereinafter, referred to as "cladding soot") that forms the cladding layer 12 is formed on the outer circumference of the core glass using an outside vapor-deposition method. In the outside vapor-deposition method, "deposition" of depositing the cladding soot on the outer circumference of the core glass is performed. At this time, in one or more embodiments, the deposition may be performed in a state where the surface of the core glass is etched with etching gas such as $SF_6$ or $C_2F_6$ to remove remaining water. During the formation of the cladding soot, the core glass and the cladding soot may be drawn in order to obtain an outer diameter in which the soot can be easily vapor-deposited. In addition, the cladding layer 12 may be vapor-deposited multiple times so as to obtain a desired outer diameter.

Next, Cl-containing gas such as $SOCl_2$ or $Cl_2$ and F-containing gas such as $SiF_4$ are mixed with each other, and this mixed gas is diffused and is caused to react in the cladding soot. As a result, the dehydration treatment and the F addition treatment of the cladding soot can be simultaneously performed.

Next, the cladding soot on which the dehydration treatment and the F addition treatment are performed is heated in a F-containing gas atmosphere to be vitrified such that the cladding layer 12 is formed. At this time, in one or more embodiments, the cladding layer 12 may be dehydrated such that an average Cl concentration distribution in a cross-section is 0.029 wt % or higher.

On the other hand, when the amount of Cl added to the cladding layer 12 is excessive, the transmission loss of the optical fiber 1 may increase due to Rayleigh scattering in the cladding layer 12. In addition, when the amount of Cl added to the cladding layer 12 is excessive, it is difficult to adjust a difference in viscosity between the core 11 and the cladding layer 12 or the refractive index profile. Therefore, in one or more embodiments, the cladding layer 12 may be dehydrated such that an average Cl concentration profile in a cross-section is 0.098 wt % or lower.

That is, in one or more embodiments, the Cl concentration in the cladding layer 12 may be 0.029 wt % to 0.098 wt %. The Cl concentration in the cladding layer 12 can be measured using a Fourier transform infrared spectrophotometer (FT-IR).

The shape of the refractive index profile and the Cl concentration distribution in the formed cladding layer 12 may become higher or lower from the outer circumference toward the inside, may be stepwise, or may be flat (uniform). In addition, a plurality of cladding layers 12 may be formed in order to obtain a desired shape of the refractive index profile and a desired Cl concentration distribution. However, in order to form a plurality of cladding layers 12, the cladding formation using an outside vapor-deposition method is performed multiple times. Therefore, in one or more embodiments, as long as optical characteristic suitable for the use can be obtained, the stepwise (FIG. 1) or W-shaped (FIG. 2) refractive index profile that can be realized with a small number of times of vapor-deposition may be utilized.

By forming the cladding layer 12 as described above, an optical fiber preform can be obtained.

(Method for Manufacturing Optical Fiber)

In addition, by melting and drawing the optical fiber preform obtained as described above, the optical fiber 1 can be manufactured.

Examples

Hereinafter, one or more embodiments will be described using specific Examples. The following Examples do not limit the present invention.

Figure 3:
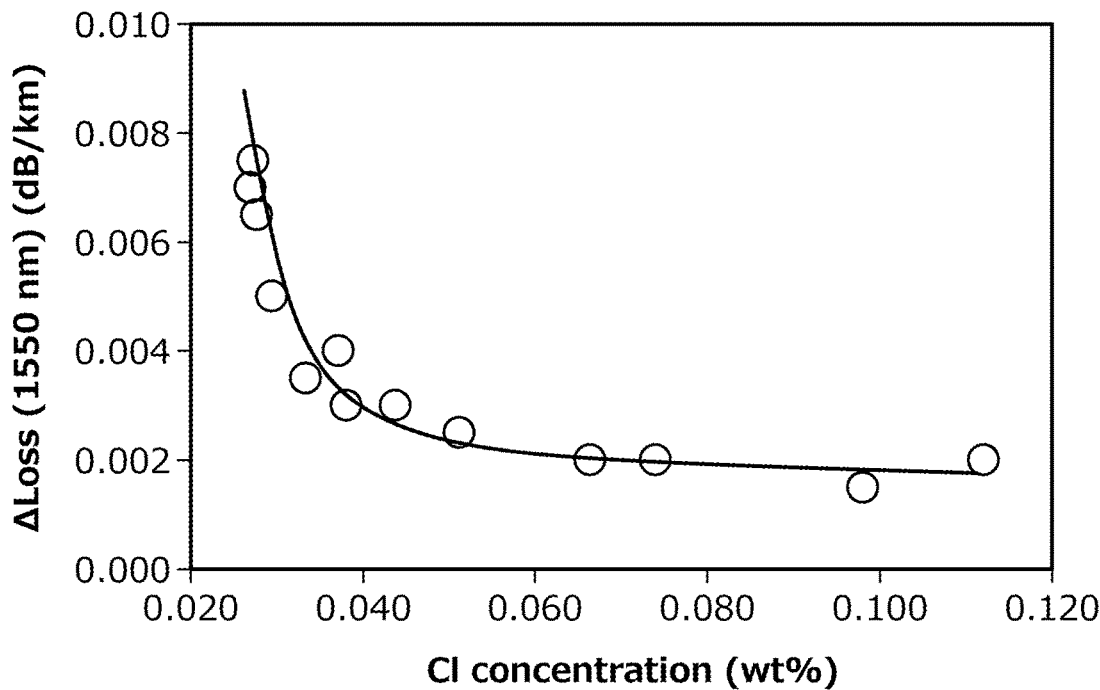
FIG. 3 is a graph showing a relationship between a Cl concentration in a cladding layer and a difference between transmission loss values before and after exposure to hydrogen according to one or more embodiments.

FIG. 3 is a graph showing a relationship between a Cl concentration in the cladding layer 12 and a transmission loss of the optical fiber 1 increased by exposure to hydrogen. The horizontal axis of FIG. 3 represents a Cl concentration (wt %) in the cladding layer 12. The vertical axis of FIG. 3 represents a difference in transmission loss $\Delta Loss$ ($=\Delta 2 - \Delta 1$). Here, $\Delta 2$ represents a value of transmission loss of the optical fiber 1 after exposure to hydrogen under conditions of $H_2$ concentration: 100%, in room temperature, and for 15 hours. $\Delta 1$ represents a value of transmission loss of the optical fiber 1 before the exposure. A measurement wavelength of transmission loss was 1550 nm, and the transmission loss was measured using an OTDR. That is, data of FIG. 3 was obtained by changing the Cl concentration in the cladding layer 12 in a state where the measurement wavelength of transmission loss was fixed.

It can be seen from FIG. 3 that, when the optical fiber 1 is exposed to hydrogen, the transmission loss at a wavelength of 1550 nm of the optical fiber 1 increases. Further, it can be seen that, as the Cl concentration in the cladding layer 12 increases, $\Delta Loss$ at a wavelength of 1550 nm decreases, and when the Cl concentration in the cladding layer 12 is 0.029 wt % or higher, $\Delta Loss$ is 0.005 dB/km or lower. That is, at a wavelength of 1550 nm, $\Delta 2 - \Delta 1 \leq 0.005$ dB/km is satisfied.

Here, in this example, the optical fiber 1 was exposed to high-concentration $H_2$ as an accelerated test. Therefore, the transmission loss of the optical fiber 1 significantly increased within a short period of time. On the other hand, H₂ is present even in a natural environment such as air or water. Therefore, it is considered that the same phenomenon occurs by exposing the optical fiber 1 in a natural environment for a long period of time. That is, when this phenomenon occurs, the transmission loss increases with the passage of time after providing the optical fiber 1 as a communication cable.

This way, the mechanism in which the transmission loss of the optical fiber 1 increases by exposing the optical fiber 1 to hydrogen will be discussed below.

Figure 4:
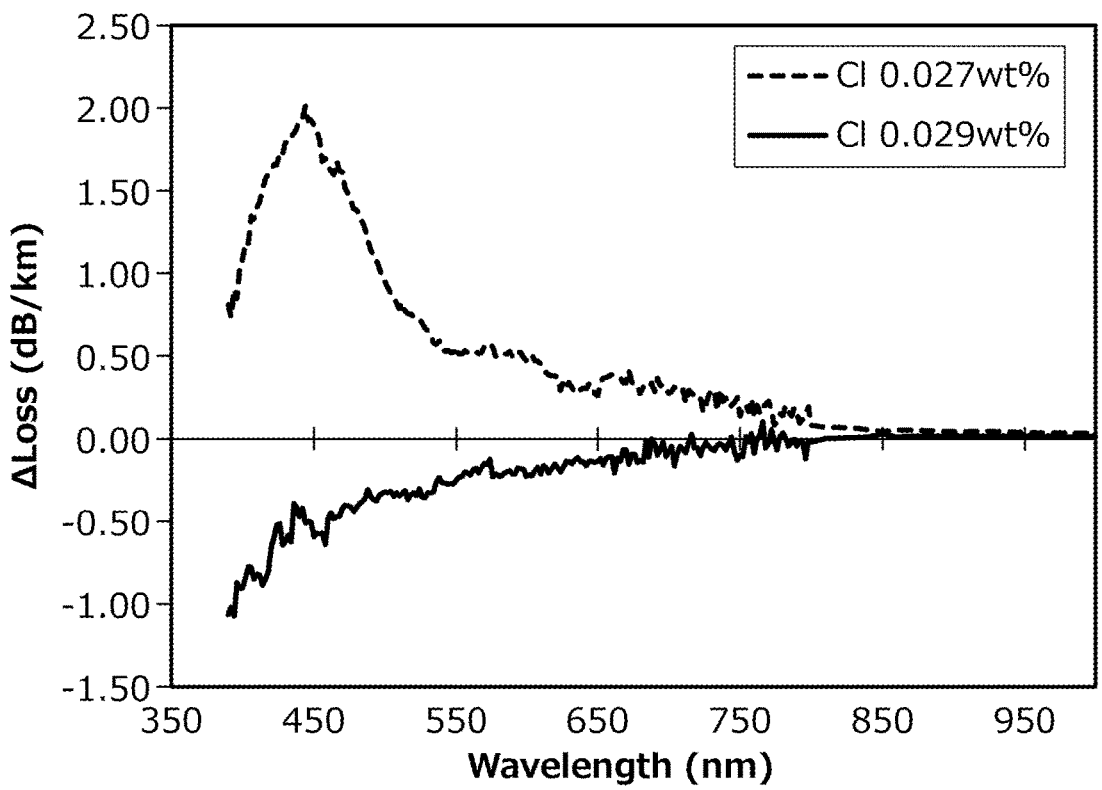
FIG. 4 is a graph showing a relationship between a wavelength of light and a difference between transmission loss values before and after exposure to hydrogen according to one or more embodiments.

FIG. 4 shows data of two kinds of the optical fibers 1 including the optical fiber 1 (Cl: 0.027 wt %) in which the cladding layer 12 was not sufficiently dehydrated and the optical fiber 1 (Cl: 0.029 wt %) in which the cladding layer 12 was sufficiently dehydrated. In FIG. 4, the horizontal axis of the graph represents a measurement wavelength of transmission loss, and the vertical axis represents ΔLoss. That is, data of FIG. 4 was obtained by changing the measurement wavelength of transmission loss in a state where the Cl concentration in the cladding layer 12 was fixed in each of the two kinds of optical fibers 1.

As shown in FIG. 4, in the optical fiber 1 (Cl: 0.027 wt %) in which the cladding layer 12 was not sufficiently dehydrated, an increase in transmission loss having a peak in the vicinity of a wavelength range 430 nm to 450 nm was shown. The value of ΔLoss decreased as the measurement wavelength increased from the vicinity of a wavelength of 450 nm. However, the increase in transmission loss reached up to the vicinity of a wavelength of 1550 nm (not shown). That is, an increase in transmission loss having a peak in the vicinity of a wavelength range 430 nm to 450 nm brings about an increase in transmission loss at a wavelength in the vicinity of a wavelength of 1550 nm used for optical communication.

It is presumed that the increase in transmission loss having a peak in the vicinity of a wavelength range 430 nm to 450 nm occurs because the cladding layer 12 is not sufficiently dehydrated. When the cladding layer 12 is not dehydrated, due to the presence of a large number of OH groups in the cladding layer 12, binding defects of SiO₂ having an action of absorbing light in the vicinity of a wavelength of 430 nm to 450 nm occurs at an interface between the core 11 and the cladding layer 12. Due to the defects, the transmission loss in the vicinity of a measurement wavelength of 430 nm to 450 nm increased.

On the other hand, in the optical fiber 1 (Cl: 0.029 wt %) in which the cladding layer 12 was dehydrated, the value of ΔLoss was negative particularly in a measurement wavelength range of 650 nm or shorter. The value of ΔLoss being negative represents that the transmission loss was reduced by exposing the optical fiber 1 to hydrogen.

The reason why the transmission loss was reduced is presumed to be that an oxygen defective type defect present in an ultraviolet range, for example, E' center of SiO₂ react with hydrogen, —H is arranged at the terminal of the defect, and a Si—H structure having a low absorbance appears. That is, due to the appearance of the Si—H structure having a low absorbance, the light absorption amount was reduced, and the transmission loss was reduced as compared to that before the exposure to hydrogen.

As a result, an increase in transmission loss caused by exposure to hydrogen can be limited by dehydrating the cladding layer 12.

Incidentally, when the dehydration treatment of the cladding layer 12 caused by Cl-containing gas is excessively performed, the refractive index of the cladding layer 12 increases due to Cl included in the cladding layer 12, and it is necessary that the refractive index of the cladding layer 12 is lower than the refractive index of the core 11 by a predetermined amount. On the other hand, when F is added to reduce the refractive index of the cladding layer 12, Rayleigh scattering increases, which causes deterioration in transmission loss. Accordingly, the Cl concentration in the cladding layer may have a predetermined range. Hereinafter, the result of verifying the predetermined range of the Cl concentration in the cladding layer 12 and the like in one or more embodiments will be described using Table 1.

TABLE 1

| Sample | | Cladding Cl Concentration *1 | Cladding OH Group Concentration | Transmission Loss (Δ1) before Exposure to H₂ *3, 4 | Difference in Transmission Loss (ΔLoss) *3~5 |
|---|---|---|---|---|---|
| Comparative Example 1 | W-Shaped | 0.026 wt % | <10 ppm *2 | 0.169 dB/km | 0.007 dB/km |
| Comparative Example 2 | W-Shaped | 0.027 wt % | <10 ppm | 0.169 dB/km | 0.0075 dB/km |
| Comparative Example 3 | W-Shaped | 0.027 wt % | <10 ppm | 0.1675 dB/km | 0.0065 dB/km |
| Example 1 | W-Shaped | 0.029 wt % | <10 ppm | 0.168 dB/km | 0.005 dB/km |
| Example 2 | Stepwise | 0.033 wt % | <10 ppm | 0.168 dB/km | 0.0035 dB/km |
| Example 3 | Stepwise | 0.037 wt % | <10 ppm | 0.1675 dB/km | 0.004 dB/km |
| Example 4 | W-Shaped | 0.038 wt % | <10 ppm | 0.1685 dB/km | 0.003 dB/km |
| Example 5 | Stepwise | 0.044 wt % | <10 ppm | 0.168 dB/km | 0.003 dB/km |
| Example 6 | Stepwise | 0.051 wt % | <10 ppm | 0.170 dB/km | 0.0025 dB/km |
| Example 7 | Stepwise | 0.066 wt % | <10 ppm | 0.1695 dB/km | 0.002 dB/km |
| Example 8 | W-Shaped | 0.074 wt % | <10 ppm | 0.1685 dB/km | 0.002 dB/km |
| Example 9 | W-Shaped | 0.098 wt % | <10 ppm | 0.170 dB/km | 0.0015 dB/km |
| Comparative Example 4 | W-Shaped | 0.112 wt % | <10 ppm | 0.174 dB/km | 0.002 dB/km |

*1: EPMA,
*2: FT-IR lower detection limit or lower,
*3: transmission loss measurement wavelength: 1550 nm,
*4: OTDR,
*5: exposure to atmosphere, H₂ concentration: 100%/room temperature (25° C. to 27° C.)/for 15 h The optical fibers 1 were prepared under a plurality of conditions (Comparative Examples 1 to 4 and Examples 1 to 9), and a relationship between the Cl concentration in the cladding layer 12 and the transmission loss was verified. The results are shown in Table 1.

"Cladding Cl Concentration" in Table 1 shows the results of measuring the average Cl concentration in the cladding layer 12 by an electron probe microanalyzer (EPMA).

"Cladding OH Group Concentration" of Table 1 shows the results of measuring the OH group concentration in the cladding layer 12 by an FT-IR. The lower detection limit of the OH group concentration by the FT-IR used herein was 10 ppm.

"Transmission Loss (Δ1) before Exposure to $H_2$" of Table 1 shows the results of measuring the transmission loss of each of the optical fibers 1 by an OTDR before exposure to hydrogen, that is, in an initial state at a wavelength of 1550 nm.

"Difference in Transmission loss (ΔLoss)" of Table 1 shows the value of transmission loss at a wavelength 1550 nm increased after exposing each of the optical fibers 1 to hydrogen under conditions of $H_2$ concentration: 100%, in room temperature (25° C. to 27° C.), and for 15 hours.

Data shown in Table 1 are arranged in order from the lowest cladding Cl concentration to the highest. That is, data shown on the upper side of Table 1 was data of the optical fiber 1 in which the cladding layer 12 was weakly dehydrated, and data shown on the lower side of Table 1 was data of the optical fiber 1 in which the cladding layer 12 was strongly dehydrated.

Here, focusing on the values of "ΔLoss" in Table 1, it can be seen that the difference in transmission loss (ΔLoss) of data (Examples 1 to 9) in which the cladding Cl concentration was 0.029 wt % or higher was less than those of data (Comparative Examples 1 to 3) in which the cladding Cl concentration was 0.026 to 0.027 wt %. That is, regarding the data in which the cladding concentration was 0.029 wt % or higher, ΔLoss was limited to be 0.005 dB/km or lower. However, regarding the data in which the cladding concentration was 0.027 wt % or lower, ΔLoss was relatively large at 0.065 dB/km or higher. In view of the above result, in one or more embodiments, the cladding Cl concentration may be 0.029 wt % or higher.

Next, focusing on the values of "Transmission Loss (Δ1) before Exposure to $H_2$" of Table 1, in the data (Examples 1 to 9) in which the cladding Cl concentration was 0.098 wt % or lower, the transmission loss was limited to be 0.170 dB/km or lower. However, in the data (Comparative Example 4) in which the cladding Cl concentration was 0.112 wt %, the transmission loss was 0.174 dB/km. In Comparative Example 4, an excess amount of Cl was added to the cladding layer 12. As a result, it was necessary to add F to reduce the refractive index of the cladding layer 12, and the initial transmission loss (Δ1) was increased due to Rayleigh scattering caused by F. In view of the above result, in one or more embodiments, the cladding Cl concentration may be 0.098 wt % or lower.

In consideration of the above-described discussion, in one or more embodiments, the Cl concentration in the cladding layer 12 may be 0.029 wt % to 0.098 wt %.

By adjusting the Cl concentration in the cladding layer 12 to be 0.029 wt % or higher, an increase in the transmission loss of the optical fiber 1 caused by exposure to hydrogen can be limited. As a result, when the optical fiber 1 is exposed to hydrogen present in air or water for a long period of time after providing the optical fiber 1 as an optical fiber cable or the like, an increase in the transmission loss of the optical fiber 1 can be limited.

Further, by adjusting the Cl concentration in the cladding layer 12 to be 0.098 wt % or lower, the cladding layer 12 includes a large amount of Cl, and an increase in refractive index is limited. Therefore, it is not necessary that the cladding layer 12 includes a large amount of fluorine or the like.

That is, an increase in the transmission loss of the optical fiber 1 caused by exposure to hydrogen can be limited while limiting the initial transmission loss of the optical fiber 1 to be low.

In addition, when the Cl concentration in the cladding layer 12 is 0.029 wt % to 0.098 wt %, the difference in transmission loss (ΔLoss) between the value Δ2 of transmission loss after exposure to hydrogen at a wavelength of 430 nm and the value Δ1 of transmission loss before exposure to hydrogen at a wavelength of 430 nm is 0 dB/km or lower (refer to FIG. 4). That is, at a wavelength of 430 nm, Δ2−Δ1≤0 dB/km is satisfied. As a result, the optical fiber 1 can exhibit an excellent effect in that it has a wavelength band in which the transmission loss is reduced by exposure to hydrogen.

In addition, when the Cl concentration in the cladding layer 12 is 0.029 wt % to 0.098 wt %, at a wavelength of 1550 nm, Δ2−1≤0.005 dB/km is satisfied (refer to FIG. 3). As a result, the optical fiber 1 can be obtained in which an increase in transmission loss caused by exposure to hydrogen can be limited even in a wavelength band used for optical communication.

The optical fiber can be manufactured in which, when cladding layer 12 is dehydrated with Cl-containing gas such that the Cl concentration in the cladding layer 12 is 0.029 wt % to 0.098 wt %, Δ1 is 0.170 dB/km or lower at a wavelength of 1550 nm, and Δ2−Δ1≤0.005 dB/km. (Refer to FIG. 3 and Table 1)

In addition, when the cladding layer 12 is dehydrated with mixed gas of Cl-containing gas and F-containing gas, the dehydration treatment and the F addition treatment of the cladding layer 12 can be simultaneously performed. Therefore, the optical fiber 1 can exhibit the above-described excellent effect while reducing the manufacturing time of the optical fiber 1.

In addition, by melting and drawing the optical fiber preform in which the Cl concentration in the soot that forms the cladding layer 12 is 0.029 wt % to 0.098 wt %, the optical fiber 1 can be manufactured in which the Cl concentration in the cladding layer 12 is 0.029 wt % to 0.098 wt %.

As shown in Table 1, all the cladding OH group concentrations of Examples 1 to 9 and Comparative Examples 1 to 4 were 10 ppm (lower detection limit of the FT-IR) or lower.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims In addition, within a range not departing from the scope of the present invention, the components according to one or more embodiments can be appropriately replaced with well-known components.

REFERENCE SIGNS LIST

1: optical fiber
11: core
12: cladding layer

What is claimed is:
1. An optical fiber comprising:
a core; and
a cladding layer disposed on an outer circumference of the core, wherein the core is formed of silicon dioxide that does not contain germanium, the cladding layer includes an inner cladding layer and an outer cladding layer disposed outside of the inner cladding layer, a refractive index of the outer cladding layer is higher than a refractive index of the inner cladding layer, an average Cl concentration distribution across a cross section of the cladding layer is 0.029 wt% to 0.098 wt%, and $\Delta2-\Delta1<0$ dB/km is satisfied at a wavelength of 430 nm, where $\Delta1$ is a value of transmission loss before exposure of the optical fiber to hydrogen and $\Delta2$ is a value of transmission loss after the exposure to pure hydrogen for at least 15 hours.

2. The optical fiber according to claim 1, wherein $\Delta2-\Delta1 \leq 0.005$ dB/km is satisfied at a wavelength of 1550 nm, where $\Delta1$ is a value of transmission loss before exposure of the optical fiber to hydrogen and $\Delta2$ is a value of transmission loss after the exposure to pure hydrogen for at least 15 hours.

3. The optical fiber according to claim 1, wherein an OH group concentration in the cladding layer is less than or equal to 10 ppm.

4. A method for manufacturing an optical fiber including a core and a cladding layer disposed on an outer circumference of the core, the method comprising:

dehydrating the cladding layer with Cl-containing gas such that a Cl concentration in the cladding layer is 0.029 wt% to 0.098 wt%, wherein the core is formed of silicon dioxide that does not contain germanium, the cladding layer includes an inner cladding layer and an outer cladding layer disposed outside of the inner cladding layer, a refractive index of the outer cladding layer is higher than a refractive index of the inner cladding layer, the cladding layer is dehydrated with the Cl-containing gas such that an average Cl concentration distribution across a cross section of the cladding layer is 0.029 wt% to 0.098 wt%, and $\Delta2-\Delta1<0$ dB/km is satisfied at a wavelength of 430 nm, where $\Delta1$ is a value of transmission loss before exposure of the optical fiber to hydrogen and $\Delta2$ is a value of transmission loss after the exposure to pure hydrogen for at least 15 hours.

5. The method according to claim 4, wherein the cladding layer is dehydrated with a mixed gas comprising a Cl-containing gas and an F-containing gas.

6. An optical fiber preform for manufacturing an optical fiber including a core and a cladding layer disposed on an outer circumference of the core, wherein the core is formed of silicon dioxide that does not contain germanium, the cladding layer includes an inner cladding layer and an outer cladding layer disposed outside of the inner cladding layer, a refractive index of the outer cladding layer is higher than a refractive index of the inner cladding layer, a soot that forms the cladding layer includes Cl, an average Cl concentration distribution across a cross section of the cladding layer formed by the soot is 0.029 wt% to 0.098 wt%, and $\Delta2-\Delta1<0$ dB/km is satisfied at a wavelength of 430 nm, where $\Delta1$ is a value of transmission loss before exposure of the optical fiber to hydrogen and $\Delta2$ is a value of transmission loss after the exposure to pure hydrogen for at least 15 hours.

\* \* \* \* \*